United States Patent [19]

Fujisawa et al.

[11] Patent Number: 4,926,166
[45] Date of Patent: May 15, 1990

[54] DISPLAY DRIVING SYSTEM FOR DRIVING TWO OR MORE DIFFERENT TYPES OF DISPLAYS

[75] Inventors: Isao Fujisawa, Nara; Katsuhiko Hashimoto, Yamatokoriyama, both of Japan

[73] Assignee: Sharp Kabushiki Kaisha, Osaka, Japan

[21] Appl. No.: 723,887

[22] Filed: Apr. 16, 1985

[30] Foreign Application Priority Data

Apr. 25, 1984 [JP] Japan ............................. 59-84603

[51] Int. Cl.⁵ .......................................... G09G 1/00
[52] U.S. Cl. ................................ 340/717; 340/720; 340/784
[58] Field of Search ............... 340/717, 721, 716, 802, 340/811, 794, 797, 723, 711, 784, 747, 720; 358/59, 241

[56] References Cited

U.S. PATENT DOCUMENTS

| | | | |
|---|---|---|---|
| 3,648,249 | 3/1972 | Goldsberry | 340/717 X |
| 3,872,446 | 3/1975 | Chambers | 340/717 X |
| 3,961,365 | 6/1976 | Payne et al. | 358/59 |
| 4,110,794 | 8/1978 | Lester et al. | 340/711 X |
| 4,112,423 | 9/1978 | Bertolasi | 340/717 X |
| 4,344,145 | 8/1982 | Chasek | 340/747 X |
| 4,443,819 | 4/1984 | Funada et al. | 340/784 X |
| 4,485,380 | 11/1984 | Soneda | 340/784 |
| 4,486,857 | 12/1984 | Heckel | 340/723 X |
| 4,550,386 | 10/1985 | Hirosawa et al. | 340/721 X |

FOREIGN PATENT DOCUMENTS 3241587 6/1983 Fed. Rep. of Germany.

OTHER PUBLICATIONS

German Journal: ntz, vol. 33, (1980), No. 4, pp. 230-236.

*Primary Examiner*—Jeffrey A. Brier
*Attorney, Agent, or Firm*—Birch, Stewart, Kolasch & Birch

[57] ABSTRACT

A display circuit for driving two or more different displays includes a display memory for storing display data, an address signal generation circuit for generating address signals for the display memory, basic timing generation circuit for generating basic timing signals, an address control circuit for controlling a determination of the address of the display memory along the horizontal- and vertical-direction of the displays, and a switching circuit for switching the horizontal- and vertical-direction timing signals depending upon which one of the two or more display is selected, whereby the two or more displays are independently operated.

9 Claims, 3 Drawing Sheets

DISPLAY DRIVING SYSTEM FOR DRIVING TWO OR MORE DIFFERENT TYPES OF DISPLAYS

BACKGROUND OF THE INVENTION

The present invention relates to a driving system and, more particularly, to a display driving system for driving at least two different types of displays such as a cathode-ray tube (CRT) and a liquid crystal display (LCD).

Conventionally, two different types of displays such as a cathode-ray tube (CRT) and a liquid crystal display (LCD) are driven with two different controllers accompanied with two specific memories, so that an individual display is enabled on the CRT and the LCD. Even if the same display pattern is to be enabled on the CRT and on the LCD, the addresses and the bit positions of the memories associated with the CRT and LCD are different because they are driven with different driving methods. Therefore, different control programs are needed in the controllers for the CRT and the LCD. Thus, a complicated circuit configuration is needed.

SUMMARY OF THE INVENTION

Accordingly, it is an object of the present invention to provide an improved driving circuit, comprising a common controller and a display memory, which drives two or more different types of displays.

It is another object of the present invention to provide an improved driving circuit, comprising a common controller and a display memory, which drives two or more different types of displays, so that the locations of the display memory can exactly correspond to dots in the two or more types of displays.

It is a further object of the present invention to provide an improved display driving circuit, comprising a common controller and a display memory, which drives two or more different types of displays using a common display program.

Briefly described, in accordance with the present invention, a display driving circuit for driving two or more display means comprises display memory means for storing display data, address signal generation means for generating address signals for the display memory means, basic timing generation means for generating basic timing signals, address control means for controlling to determine the address of the display memory means along horizontal- and vertical-direction of the two or more display means, and switch means for switching the horizontal- and vertical-direction timing signals according to the number of the two or more display means, whereby the two or more display means are independently operated.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE PREFERRED EMBODIMENT

Figure 1:
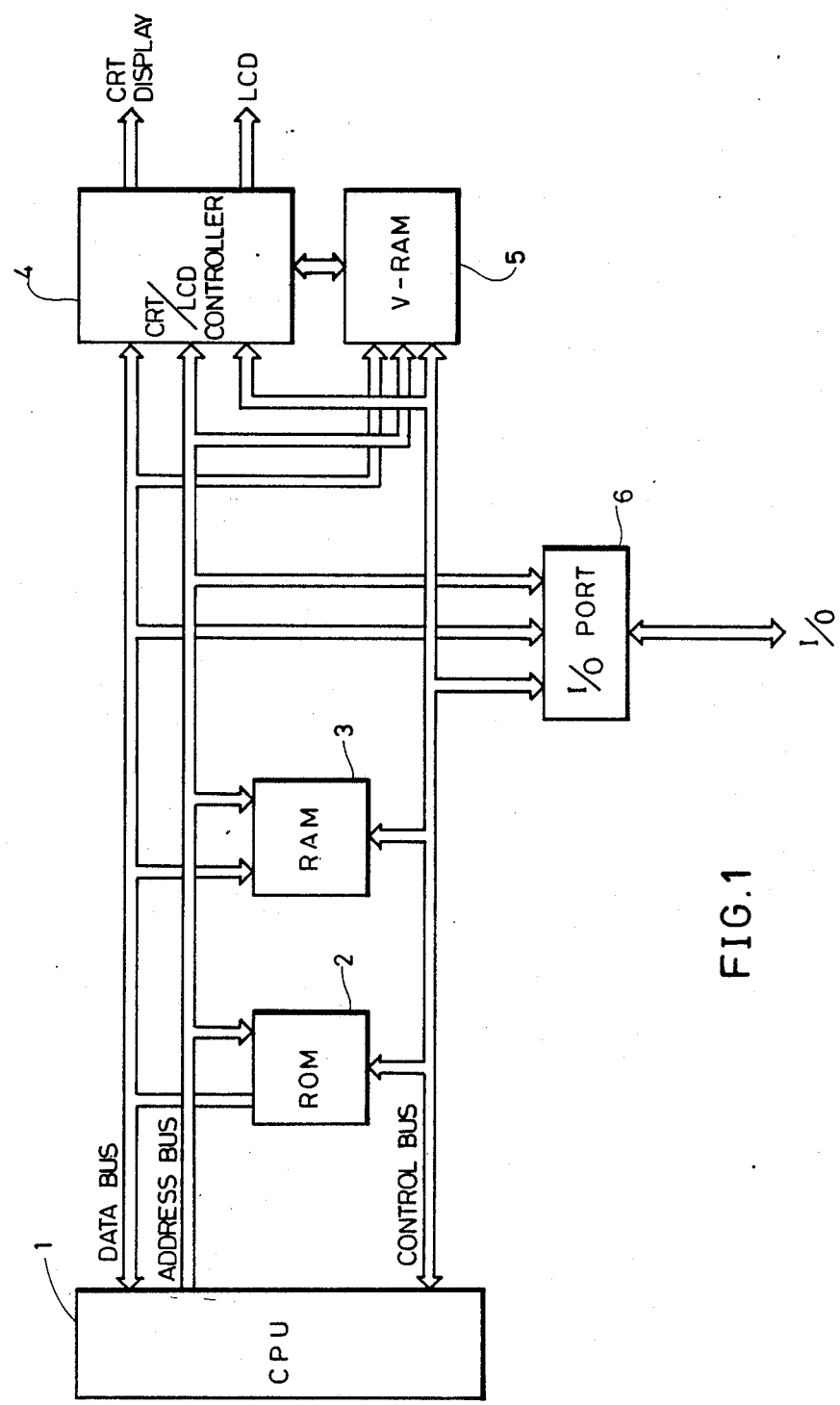
FIG. 1 is a block diagram of a display system according to the present invention.

FIG. 1 is a block diagram of a driving circuit for driving two or more different types of displays such as a cathode-ray tube (CRT) and a liquid crystal display (LCD).

The circuit of FIG. 1 comprises a central processing unit (CPU) 1, a read only memory (ROM) 2, a random access memory (RAM) 3, a common controller 4 for a cathode-ray tube (CRT) and a liquid crystal display (LCD), a display memory V-RAM (Video RAM) 5 for the controller 4, and an input/output (I/O) port 6.

Figure 2:
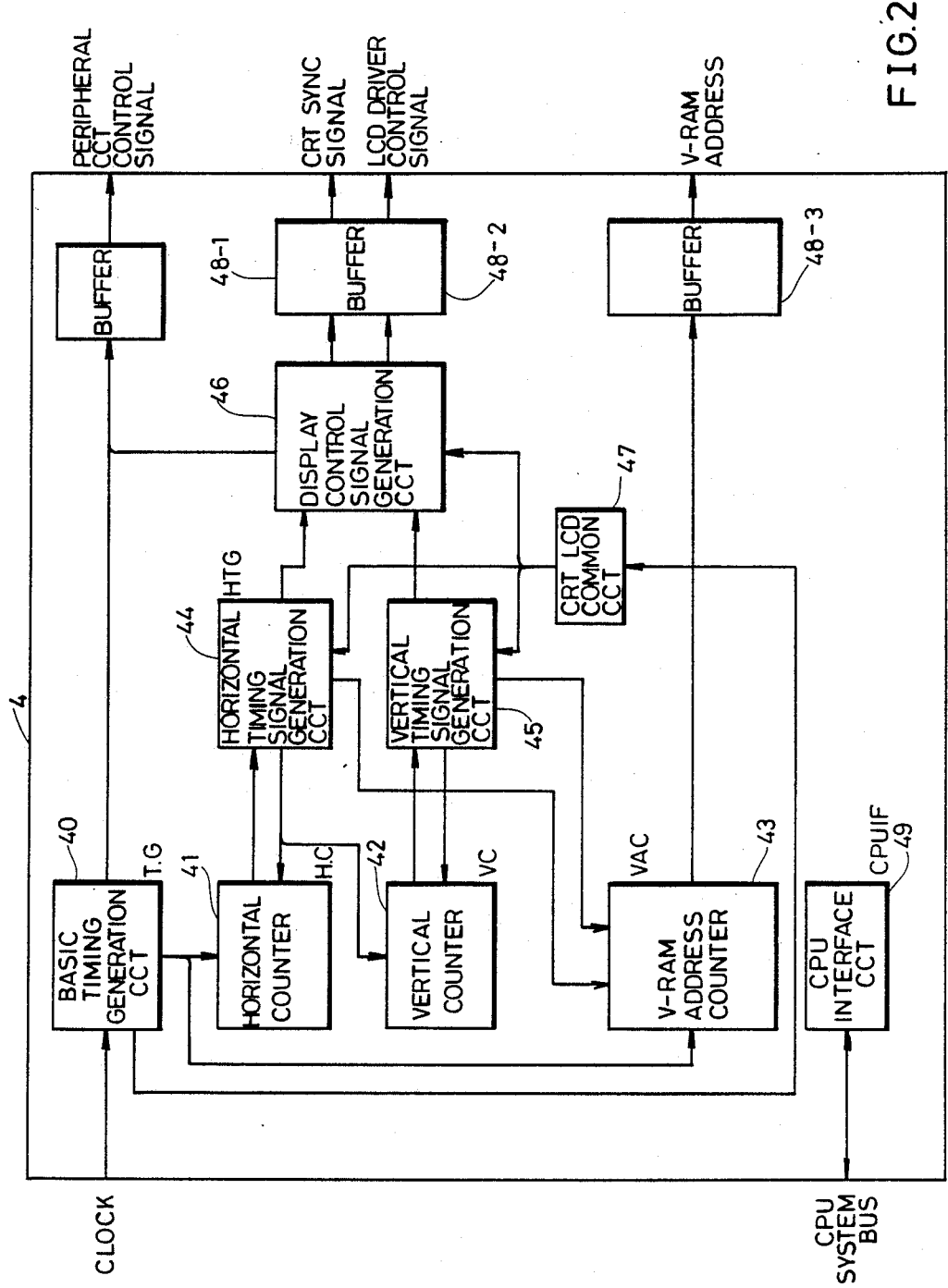
FIG. 2 is a block diagram of a common controller in the system of FIG. 1.

FIG. 2 is a block diagram of the common controller 4. The controller 4 comprises a basic timing generation circuit 40, a horizontal-direction counter 41, a vertical-direction counter 42, a V-RAM address counter 43, a CPU interface 49, and three buffers 48-1 through 48-3, which are all common with the CRT and the LCD. There are provided a horizontal-direction timing signal generation circuit 44, a vertical-direction timing signal generation circuit 45, and a display control signal generation circuit 46, which are all provided for generating different timing signals for the CRT and the LCD. A CRT/LCD common circuit 47 is provided for commonly driving the CRT and the LCD. The basic timing generation circuit 40 is responsive to the external clock signal applied thereto for generating timing signals, which are partially applied to a peripheral circuit such as a serial/parallel conversion shift register. The horizontal-direction counter 41 serves to count character clock signal (basic clock signal in the horizontal direction) from the basic timing generation circuit 40. The output of the counter 41 is applied to the horizontal-direction timing signal generation circuit 44 to generate timing signals in the horizontal direction.

The horizontal-direction timing signal generation circuit 44 serves to compare the output of the horizontal-direction counter 41 with the number of the displayed characters in a single line, the number of the total characters, and the values of the synchronization positions, so as to generate timing signals in the horizontal direction for showing displays on the CRT and the LCD (horizontal blanking signal sync signals, and the latch signals of the LCD driver), and to produce the clock signals for the vertical-direction counter 42. These clock signals are also used to reset the horizontal-direction counter 41.

The vertical-direction counter 42 and the vertical-direction timing signal generation circuit 45 function to provide vertical-direction timing signals in a manner similar to that of the horizontal-direction counter 41 and the horizontal-direction timing signal generation circuit 44, respectively.

The display control signal generation circuit 46 is responsive to the outputs of the horizontal-direction timing signal generation circuit 44 and the vertical-direction timing signal generation circuit 45 for generating signals for driving the CRT and the LCD. These outputs contain horizontal blanking, vertical sync signal, the vertical blanking, and the latch signals for the LCD driver.

The V-RAM address counter 43 functions as a counter for indicating address of the V-RAM providing display data. The counter 43 is responsive to the character clock signals from the basic timing counter 40. It is also responsive to the signals in the blanking period, the end of a single picture provided from the horizontal-direction timing signal generation circuit 44 and the vertical-direction timing signal generation circuit 45.

The CRT/LCD common circuit 47 serves to switch the horizontal-direction timing signal generation circuit 44, the vertical-direction timing signal generation circuit 45, and the display control signal generation circuit 46, which are differently operated for the CRT and the LCD. It is further operated to select the timing.

The CPU interface 49 serves to directly connect the system bus for the CPU and to generate chip select signals for the controller.

In operation, the horizontal-direction counter 41 serves to count the external character clock signals, so that its output is monitored by the horizontal-direction timing signal generation circuit 44 which detects a specific value, thereby generating a timing signal for a single line. The horizontal-direction timing signal generation circuit 44 serves to generate reset signals to the horizontal-direction counter 41 and clock signals to the vertical-direction counter 42, the reset and the clock signals being generated at the end of the single line. The vertical-direction timing signals are generated by the vertical-direction counter 42 and the vertical-direction timing signal generation circuit 45 in the same manner as the horizontal direction timing signals. The V-RAM 43 is operated in response to these signals and the character clock signals, so that the address of the V-RAM is generated.

The display control signal generation circuit 46 is responsive the signals from the horizontal-direction timing signal generation circuit 44 and the vertical-direction generation circuit 45 for generating the displays applied to the displays of the CRT and the LCD.

The CRT/LCD common circuit 47 serves to switch the LCD- and the CRT-oriented parts in the horizontal-direction timing signal generation circuit 44, the vertical-direction timing signal generation circuit 45, and the display control signal generation circuit 46, thereby selecting the proper timing.

Figure 3:
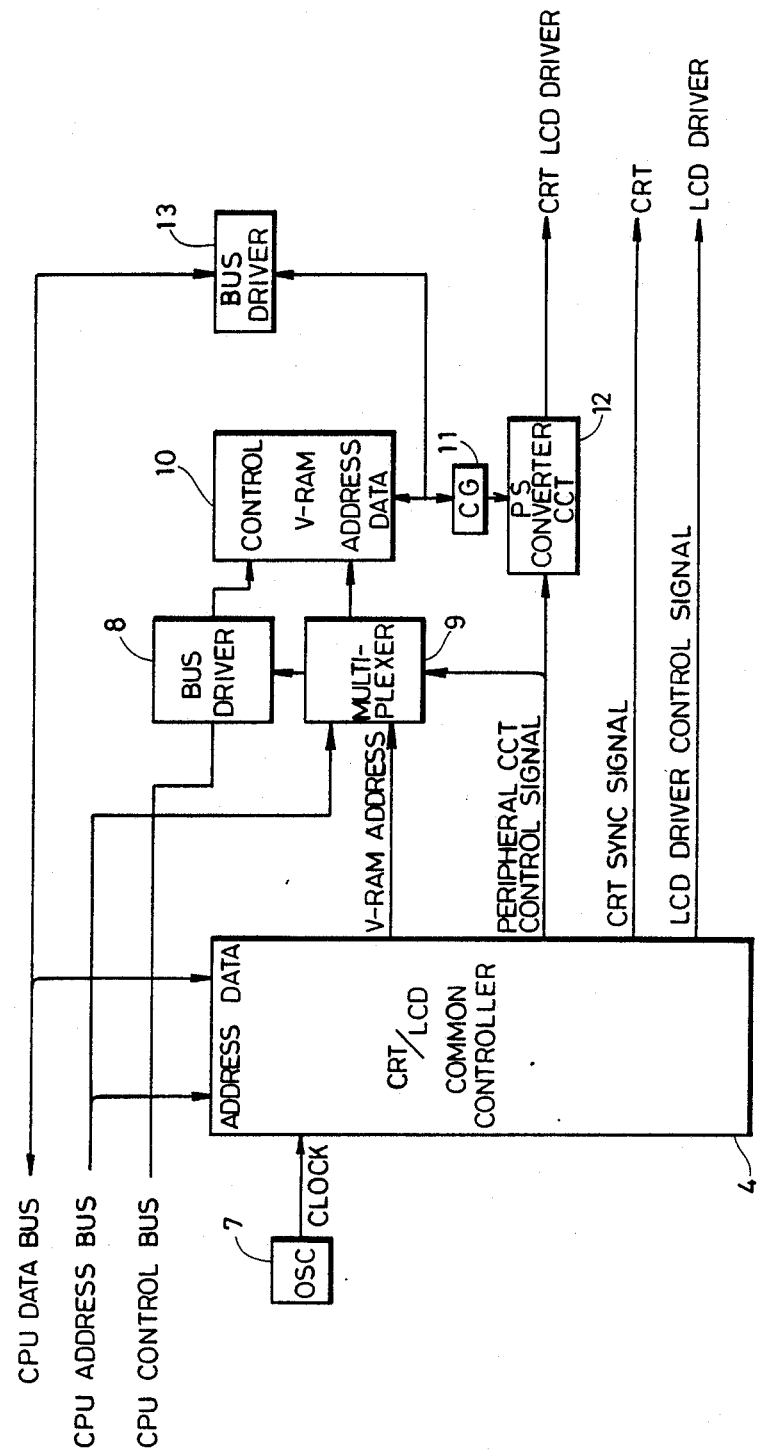
FIG. 3 is a block diagram of other circuit elements connected to the common controller of FIG. 2.

FIG. 3 is a block diagram of other circuit elements connected to the CRT/LCD common controller 4.

The CRT/LCD common controller 4 provides the V-RAM address and the CPU address, which are selectively inputted to a V-RAM 10 as the address input signal through a multiplexer 9. A parallel/serial (P/S) converter circuit 12 is provided for converting the parallel display data from a character generator (CG) 11 into serial display data to the CRT or the LCD driver.

As CRT sync signals, the horizontal-direction sync signals and the vertical-direction sync signals are provided, which are applied directly to the CRT or combined with the serial display data to make composite video signals which are applied to the CRT.

The LCD driver is adopted to serially receive the display data, so that the display signals corresponding to the dots aligned in a single horizontal-line in the LCD are introduced into a latch circuit. The entered latch signals are converted into segment signals according to the timings of the common signals and, at the same time, are applied to the LCD. For the LCD driver control signals, there is provided a data conversion clock for serially transferring the display data, a first-line indication signal indicating that it is a timing when the first line of the LCD is to be selected, a single-line latch signal indicating a timing when data for a single horizontal line are to be latched, and an alternative current signal indicating a cycle when the polarity of the segment and the common signals are to be reversed.

In the above preferred embodiment of the present invention, the character code data are stored within the V-RAM 10, so that the LCD or the CRT is operated to display a character corresponding to the character codes. To provide a graphic display, the V-RAM 10 should store the bit pattern exactly corresponding to the dot pattern of the LCD or the CRT, in which the data from the V-RAM 10 are directly converted from parallel data to serial data to make display data. The character generator 11 should be neglected.

In the above description, the P-S conversion circuit 12 is additionally provided at the outside of the CRT/LCD common controller 4. It may be possible for the CRT/LCD common controller 4 to contain a P-S conversion circuit, so that the CRT/LCD common controller 4 can directly output the serial display data.

Any displays other than the CRT and the LCD such as a light emitting diode (LED) or an electroluminescent display (EL) can be adapted to the present invention. The number of the displays is not necessarily limited to two.

According to the present invention, switching means is provided for switching the horizontal- and vertical-direction timing signals so as to be in harmony with two or more different types of the displays of CRT or LCD, so that a display controller can be commonly used and a single display memory can be provided for simplicity. A common program can be executed to operate the two or more displays.

While only certain embodiments of the present invention have been described, it will be apparent to those skilled in the art that various changes and modifications may be made therein without departing from the spirit and scope of the present invention as claimed.

What is claimed is:

1. A display driving system for driving two or more different types of displays, each type having different driving requirements, comprising:
   central processing means for producing data signals and control signals;
   display memory means for storing display information to be displayed on a said display; and
   controller means, connected to said central processing means and said display memory means, for selecting one of said different types of displays to be driven by said display drive system and for producing driver control signals related to the different driving requirements of the two or more different types of displays, for developing driving signals tailored to the driving requirements of said selected type of display from said display information and said driver control signals, and for applying said driving signals to said selected one of the different types of displays to develop an image thereon from said driving signals.

2. The display driving system of claim 1 wherein the different types of displays include a cathode ray tube display and a liquid crystal display.

3. The display driving system of claim 1 wherein said means comprises a video random access memory.

4. The display driving system of claim 1 wherein said controller means comprises:
   common circuit means for producing a switching signal, said switching signal representing the type of display selected;
   means for generating a horizontal timing switch, said means being responsive to said switching signal and varying said horizontal timing signal in accordance with said switching signal;

means for generating a vertical timing signal, said means being responsive to said switching signal and varying said vertical timing signal in accordance with said switching signal; and means for generating a display control signal in response to said horizontal timing signal and said vertical timing signal.

5. The display driving system of claim 4 wherein said controller means further comprises:

address counter means, responsive to said horizontal timing signal and vertical timing signal, for generating an address to be accessed in said display memory means.

6. The display driving system of claim 4 wherein said controller means further comprises:

a clock signal source developing a clock signal output;

a timing generation circuit developing horizontal clock signals from said clock signal output of said clock signal source;

a horizontal counter counting said horizontal clock signals, wherein said means for generating a horizontal timing signal monitors said horizontal counter and produces a horizontal reset signal when said horizontal counter contains a value equal to a horizontal threshold value, said horizontal reset signal causing said horizontal counter to be reset; and a vertical counter counting said horizontal reset signals, wherein said means for generating a vertical timing signal monitors said vertical counter and produces a vertical reset signal when said vertical counter contains a value equal to a vertical threshold value, said vertical reset signal causing said vertical counter to be reset.

7. A controller for a display circuit capable of driving a display selected from two or more different types with display information from a common memory, each type of display having different driving requirements, comprising:

common circuit means for producing a switching signal, said switching signal varying in accordance with the type of display selected;

means for generating a horizontal timing signal, said means being responsive to said switching signal and varying said horizontal timing signal in accordance with said switching signal;

means for generating a vertical timing signal, said means being responsive to said switching signal and varying said vertical timing signal in accordance with said switching signal; and means for generating a display control signal in response to said horizontal timing signal and said vertical timing signal.

8. The controller of claim 7 further comprising:

address counter means, responsive to said horizontal timing signal and vertical timing signal, for generating an address to be accessed in the common memory.

9. The controller of claim 7, further comprising:

a clock signal source developing a clock signal output;

a timing generating circuit developing horizontal clock signals from said clock signal output of said clock signal source;

a horizontal counter counting said horizontal clock signals, wherein said means for generating a horizontal timing signal monitors said horizontal counter and produces a horizontal reset signal when said horizontal counter contains a value equal to a horizontal threshold value, said horizontal reset signal causing said horizontal counter to be reset; and a vertical counter counting said horizontal reset signals, wherein said means for generating a vertical timing signal monitors said vertical counter and produces a vertical reset signal when said vertical counter contains a value equal to a vertical threshold value, said vertical reset signal causing said vertical counter to be reset.

* * * * *

UNITED STATES PATENT AND TRADEMARK OFFICE
CERTIFICATE OF CORRECTION

PATENT NO. : 4,926,166

DATED : May 15, 1990

INVENTOR(S) : Fujisawa et al.

It is certified that error appears in the above-identified patent and that said Letters Patent is hereby corrected as shown below:

Please correct the Serial Number for the above-identified Patent to read as follows:

Application No: 723,877
Filed: April 16, 1985

Signed and Sealed this

Sixth Day of August, 1991

Attest:

HARRY F. MANBECK, JR.

*Attesting Officer*　　　　*Commissioner of Patents and Trademarks*